US012399451B2

(12) United States Patent
Kitabayashi et al.

(10) Patent No.: US 12,399,451 B2
(45) Date of Patent: Aug. 26, 2025

(54) FIXING DEVICE FOR IMAGE FORMING APPARATUS WITH RETENTION MEMBER HAVING GROOVE FOR RETAINING LUBRICANT

(71) Applicant: KYOCERA Document Solutions Inc., Osaka (JP)

(72) Inventors: Yuta Kitabayashi, Osaka (JP); Ryohei Tokunaga, Osaka (JP); Hiroki Kawasaki, Osaka (JP); Shunsaku Fujii, Osaka (JP); Rina Kikugawa, Osaka (JP); Akihiro Kondo, Osaka (JP); Yuto Masaoka, Osaka (JP); Tomohiro Watatani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/674,192

(22) Filed: May 24, 2024

(65) Prior Publication Data

US 2024/0393719 A1 Nov. 28, 2024

(30) Foreign Application Priority Data

May 26, 2023 (JP) ................................ 2023-086778

(51) Int. Cl.
*G03G 15/20* (2006.01)

(52) U.S. Cl.
CPC ..... *G03G 15/2028* (2013.01); *G03G 15/2025* (2013.01); *G03G 15/2064* (2013.01); *G03G 2215/2035* (2013.01)

(58) Field of Classification Search
USPC .................................................. 399/320, 329
See application file for complete search history.

(56) References Cited

U.S. PATENT DOCUMENTS

2020/0379386 A1 12/2020 Watatani et al.

FOREIGN PATENT DOCUMENTS

JP 2001203062 A * 7/2001 ......... G03G 15/2064
JP 2020197701 A 12/2020

* cited by examiner

*Primary Examiner* — Quana Grainger
(74) *Attorney, Agent, or Firm* — Alleman Hall & Tuttle LLP

(57) ABSTRACT

In a fixing device, a heater heats an endless rotatable fixing belt. A retention member includes a groove for retaining a lubricant and retains the heater such that a surface on a front side comes into contact with an inner circumferential surface of the fixing belt via the lubricant. A pressure member is pressed against the heater while the fixing belt is interposed therebetween and forms, with the fixing belt, a pressure region for heating and pressurizing a paper sheet onto which a toner image has been transferred. A guide guides the paper sheet to the pressure region. The guide causes the paper sheet to come into contact with the fixing belt at a position more on a downstream side of a rotation direction of the fixing belt than the groove, to guide the paper sheet to the pressure region.

4 Claims, 4 Drawing Sheets

FIXING DEVICE FOR IMAGE FORMING APPARATUS WITH RETENTION MEMBER HAVING GROOVE FOR RETAINING LUBRICANT

INCORPORATION BY REFERENCE

This application is based upon and claims the benefit of priority from the corresponding Japanese Patent Application No. 2023-086778 filed on May 26, 2023, the entire contents of which are incorporated herein by reference.

BACKGROUND

The present invention relates to a fixing device which fixes a toner image onto a paper sheet, and an image forming apparatus including this fixing device.

A slide-type fixing device includes an endless fixing belt which is heated by a heater and a pressure member which comes into contact with the fixing belt to form a pressure region. By rotations of the fixing member and the pressure member, a toner image is fixed onto a paper sheet conveyed to the pressure region.

In such a fixing device, a lubricant such as grease is supplied between the fixing belt and the heater so as to enable the fixing belt to stably slide with respect to the heater. If the lubricant becomes insufficient, torque rises to cause a passing failure of the paper sheet, a breakage of the fixing device, and the like.

However, an amount of lubricant that can be retained between the fixing belt and the heater is limited. When a large amount of lubricant is retained, heat transmission from the heater to the fixing belt becomes unstable due to a heat resistance by the lubricant. Therefore, a structure which enables the lubricant to be stably supplied a certain amount at a time for a long period of time is necessary.

For example, it is known that in the fixing device, a groove for retaining the lubricant is formed in a retention member which retains the heater. A plurality of grooves are formed along a width direction of the fixing belt. By causing the grooves to retain and gradually supply the lubricant, a sliding property of the fixing belt with respect to the heater can be maintained for a long period of time.

However, physical properties may differ between the lubricant retained in the grooves and the retention member excluding the grooves. In this case, a temperature and pressure of the fixing belt may differ between a region where the fixing belt is in contact with the lubricant and a region where the fixing belt is in contact with the retention member.

Meanwhile, a paper sheet is guided to the pressure region by a guide. At this time, for enhancing an effect of heating the paper sheet, the guide is configured to guide the paper sheet to the pressure region after causing the paper sheet to come into contact with the fixing belt. At this time, if the paper sheet comes into contact with the fixing belt at a portion where the grooves of the retention member are formed, since this portion is a portion where the difference in temperature and pressure of the fixing belt is caused as described above, heating unevenness of the paper sheet or an image failure occurs.

SUMMARY

According to the present invention, there is provided a fixing device including: an endless rotatable fixing belt; a heater which heats the fixing belt; a retention member which includes a groove for retaining a lubricant and retains the heater such that a surface on a front side comes into contact with an inner circumferential surface of the fixing belt via the lubricant; a pressure member which is pressed against the heater while the fixing belt is interposed therebetween and forms, with the fixing belt, a pressure region for heating and pressurizing a paper sheet onto which a toner image has been transferred; and a guide which guides the paper sheet to the pressure region, in which the guide causes the paper sheet to come into contact with the fixing belt at a position more on a downstream side of a rotation direction of the fixing belt than the groove, to guide the paper sheet to the pressure region.

In the present invention, an intersection point of a line extending from a paper sheet guide surface of the guide and the fixing belt may be positioned more on the downstream side of the rotation direction of the fixing belt than the groove.

In the present invention, the guide may be configured such that an intersection point of a line extending from a paper sheet guide surface of the guide and the fixing belt moves more toward the downstream side of the rotation direction of the fixing belt than the groove as a weight of the paper sheet increases.

According to the present invention, there is provided an image forming apparatus including: an image forming portion which forms a toner image on a paper sheet; and the fixing device which fixes the toner image onto the paper sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an image forming apparatus and a fixing device according to the present invention will be described with reference to the drawings.

Figure 1:
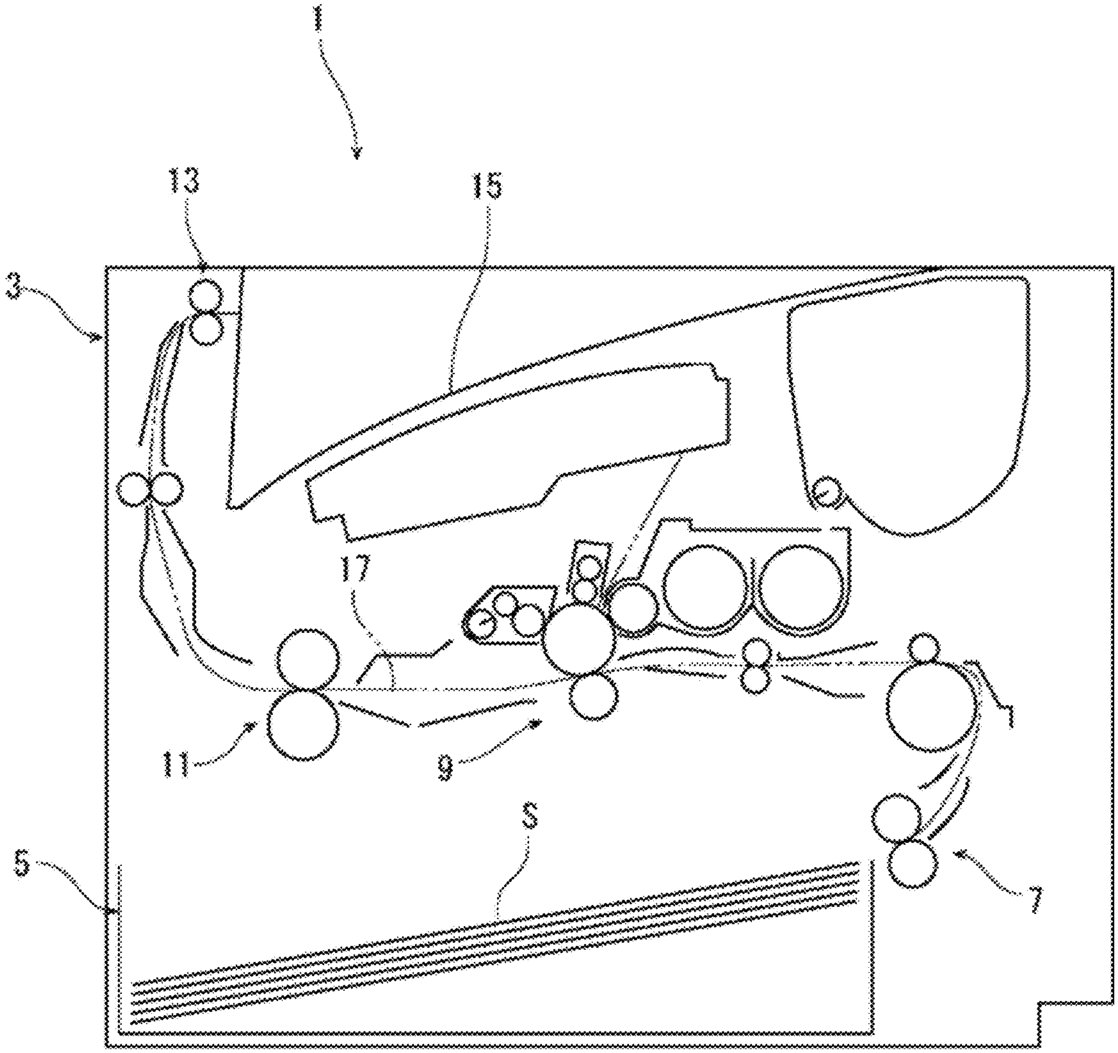
FIG. 1 is a front view schematically showing an internal configuration of an image forming apparatus according to an embodiment of the present invention.

First, an overall configuration of an image forming apparatus 1 will be described with reference to FIG. 1. FIG. 1 is a front view schematically showing an internal configuration of the image forming apparatus 1. Hereinafter, a near side of a sheet surface in FIG. 1 is defined as a front surface side (front side) of the image forming apparatus 1.

An apparatus body 3 of the image forming apparatus 1 includes a sheet feed cassette 5 which stores paper sheets S, a sheet feed device 7 which feeds the paper sheet S from the sheet feed cassette 5, an image forming portion 9 which forms a toner image on the paper sheet S using electrophotography, a fixing device 11 which fixes the toner image onto the paper sheet S, a sheet discharge device 13 which discharges the paper sheet S, and a sheet discharge tray 15 on which the discharged paper sheets S are stacked.

In addition, the apparatus body 3 is formed with a conveying path 17 of the paper sheet S, which is provided from the sheet feed device 7 to the sheet discharge device 13 via the image forming portion 9 and the fixing device 11.

Figure 2:
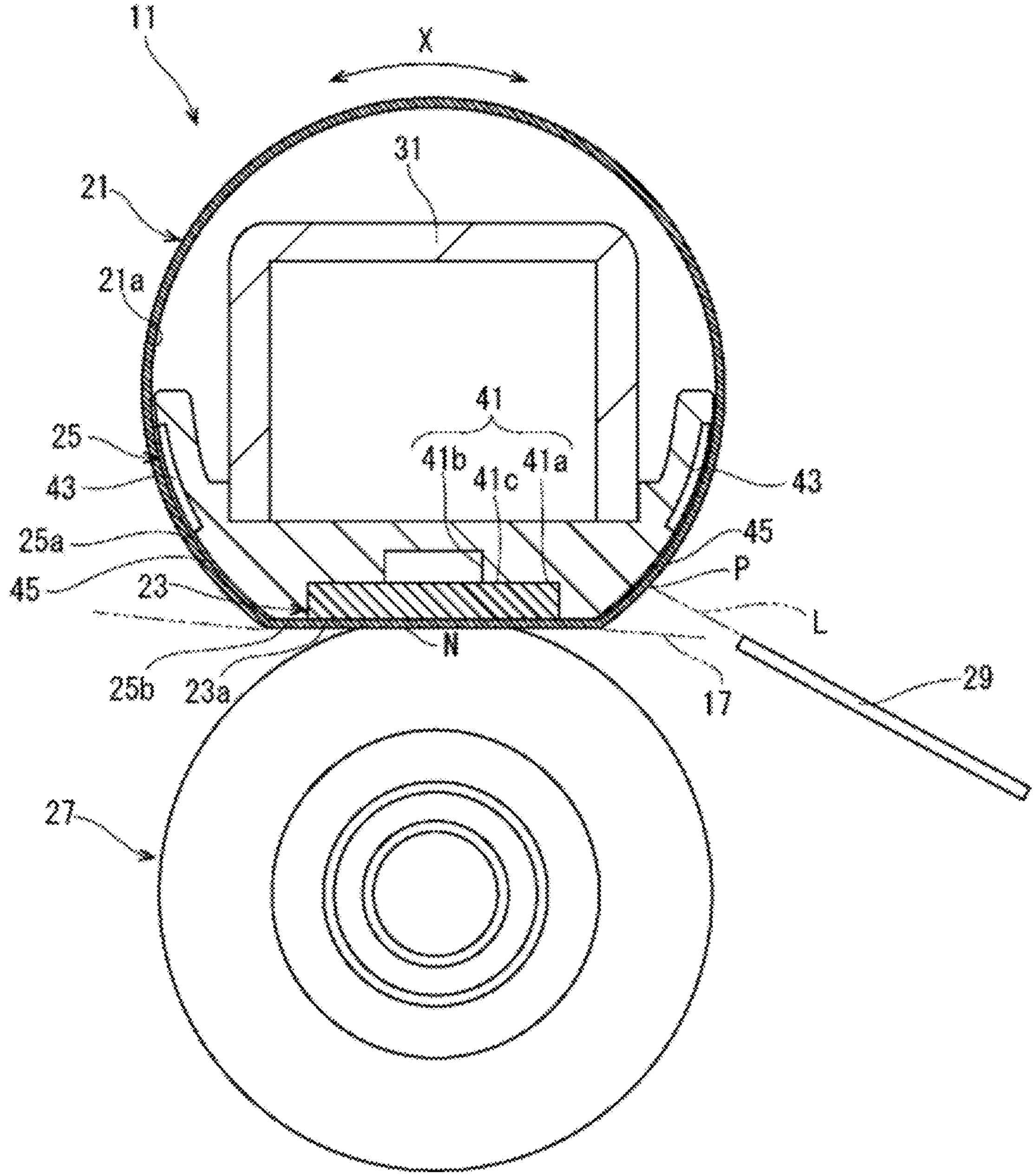
FIG. 2 is a cross-sectional view schematically showing an internal configuration of a fixing device according to the embodiment of the present invention.

Next, the fixing device 11 will be described with reference to FIG. 2. FIG. 2 is a cross-sectional view of the fixing device 11.

As shown in FIG. 2, the fixing device 11 includes a fixing belt 21, a heater 23 which heats the fixing belt 21, a retention member 25 which retains the heater 23, a pressure roller 27 as a pressure member which forms a pressure region N with the fixing belt 21, and a guide 29 which guides the paper sheet S to the pressure region N.

The fixing belt 21 is an endless belt and has a predetermined inner diameter and a width larger than that of the paper sheet S. The fixing belt 21 is formed of a material having flexibility and includes a base material layer, an elastic layer provided on an outer circumferential surface of the base material layer, and a release layer provided on an outer circumferential surface of the elastic layer.

The base material layer is formed of metal such as SUS and Ni. The elastic layer is formed of silicon rubber or the like. The release layer is formed of a PFA tube or the like. A slide layer may be formed on an inner circumferential surface of the base material layer. The slide layer is formed of polyamide imide, PTFE, or the like.

Both end portions of the fixing belt 21 are supported by end portion holders (not shown). The both end portion holders are rotatably supported by a fixing housing (not shown).

In addition, a stay 31 penetrates through a hollow portion of the fixing belt 21. Both end portions of the stay 31 are supported by the fixing housing.

The heater 23 is a flat plate member and has a width equivalent to that of the fixing belt 21 (a length along a width direction Y intersecting with a circumferential direction X) and a predetermined length and thickness.

The heater 23 has a laminated structure in which a substrate formed of stainless steel or ceramic, an electric insulation layer formed of glass, a resistance heating element layer having an electrode, and a protection layer are laminated in order from a back side toward a front side.

A front surface of the protection layer is formed to be flat and is a slide surface 23*a* that comes into contact with an inner circumferential surface 21*a* of the fixing belt 21. The resistance heating element layer generates heat by being energized via the electrode.

Figure 3:
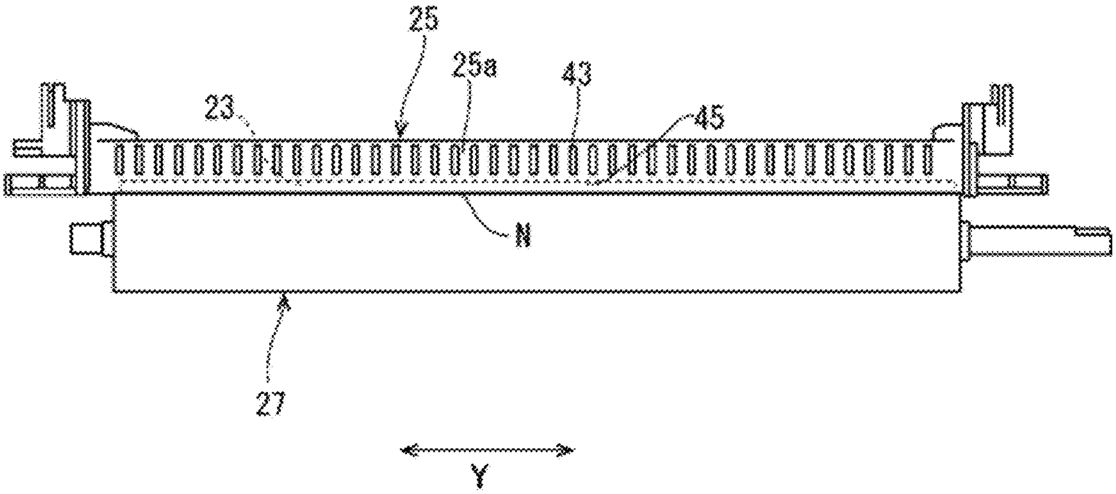
FIG. 3 is a side view showing a retention member of the fixing device according to the embodiment of the present invention.

Next, the retention member 25 will be described also with reference to FIG. 3. FIG. 3 is a side view showing the retention member 25 and the pressure roller 27.

The retention member 25 is a member substantially in a semicylindrical shape and has a width equivalent to that of the fixing belt 21 and a predetermined length along the circumferential direction X. The retention member 25 is formed of a resin having heat resistance, such as liquid crystal polymer.

As shown in FIG. 2, an outer circumferential surface 25*a* of the retention member 25 is curved so as to be provided along the inner circumferential surface 21*a* of the fixing belt 21. An outer circumferential surface of a top portion 25*b* of the retention member 25 is formed to be flat. At this top portion 25*b*, a concave portion 41 for housing the heater 23 is formed along the width direction Y.

The concave portion 41 includes an outer-side concave portion 41*a* having a large length along the circumferential direction X and an inner-side concave portion 41*b* having a smaller length along the circumferential direction X than the outer-side concave portion 41*a*. On both sides of the inner-side concave portion 41*b* in the circumferential direction X, a flange 41*c* parallel to the outer circumferential surface of the top portion 25*b* of the retention member 25 is formed.

The heater 23 is housed in the outer-side concave portion 41*a*. A surface of the heater 23 on the front side is on the same plane as the outer circumferential surface of the top portion 25*b* of the retention member 25, and a surface of the heater 23 on the back side is in contact with the flange 41*c* of the concave portion 41.

In addition, as shown also in FIG. 3, on the outer circumferential surface 25*a* of the retention member 25, a plurality of grooves 43 for accumulating a lubricant (for example, grease) are formed on both sides of the concave portion 41 in the circumferential direction X.

The grooves 43 have a predetermined length along the circumferential direction X and are formed at predetermined intervals along the width direction Y. The plurality of grooves 43 are formed at predetermined intervals from the concave portion 41 in the circumferential direction X.

In other words, between a portion where the grooves 43 are formed (will be referred to as a groove forming portion) and the concave portion 41 in the circumferential direction X, there is a portion where the grooves 43 are not formed (will be referred to as a non-groove forming portion 45).

Referring back to FIG. 2, the pressure roller 27 includes a core metal, an elastic layer provided on an outer circumferential surface of the core metal, and a release layer provided on an outer circumferential surface of the elastic layer. The elastic layer is formed of silicon rubber or the like. The release layer is formed of a PFA tube or the like.

The pressure roller 27 is supported while being pressed against the heater 23 from below the fixing belt 21. Thus, the pressure region N is formed between the fixing belt 21 and the pressure roller 27.

The pressure roller 27 is driven by a motor (not shown) to rotate in a counterclockwise direction in FIG. 2. When the pressure roller 27 is driven by the motor and rotates, the fixing belt 21 is driven to rotate in a clockwise direction in FIG. 2 opposite to the pressure roller 27. Thus, the paper sheet S conveyed along the conveying path 17 passes through the pressure region N.

The guide 29 is arranged more on an upstream side of a conveying direction of the paper sheet S than the pressure region N and guides the paper sheet S conveyed along the conveying path 17 to the pressure region N.

As shown in FIG. 2, an intersection point P of a line L extending from a paper sheet guide surface (an upper surface) of the guide 29 and the fixing belt 21 opposes the non-groove forming portion 45 of the retention member 25.

A fixing operation of the fixing device 11 having the configuration described above will be described. First, the pressure roller 27 is driven by the motor and rotates, and the fixing belt 21 is driven by the pressure roller 27 to rotate in a direction opposite to the rotation direction of the pressure roller 27 (the clockwise direction in FIG. 2). At the same time, the heater 23 is driven and heats the fixing belt 21. The fixing belt 21 is heated to a predetermined control temperature (for example, 160° C.).

Further, the lubricant accumulated in the grooves 43 of the retention member 25 spreads across the entire surface of the non-groove forming portion 45 from the grooves 43 to be stably supplied between the inner circumferential surface 21*a* of the fixing belt 21 and the slide surface 23*a* of the heater 23. This lubricant enables the fixing belt 21 to stably slide with respect to the heater 23.

After the fixing belt 21 is heated in this manner, the paper sheet S onto which a toner image has been transferred is guided by the guide 29 to be conveyed to the pressure region N. At this time, as described above, after coming into contact with the fixing belt 21 at a position opposing the non-groove forming portion 45 of the retention member 25, a tip end of the paper sheet S moves to the pressure region N along with the rotation of the fixing belt 21.

As described above, since the lubricant spreads substantially uniformly across the entire surface of the non-groove forming portion 45 and the temperature and pressure of the fixing belt 21 are thus substantially uniform, heating unevenness of the paper sheet does not occur even when the paper sheet comes into contact with the non-groove forming portion 45.

When the paper sheet S passes through the pressure region N, the paper sheet S is heated by the fixing belt 21 and pressurized by the pressure roller 27 and the fixing belt 21, with the result that a toner image is fixed onto the paper sheet S. The paper sheet S onto which the toner image has been fixed is conveyed along the conveying path 17 from the pressure region N.

As described above, according to the fixing device 11 of the present invention, the paper sheet guided by the guide comes into contact with the fixing belt 21 at a position opposing the non-groove forming portion 45.

Since the lubricant spreads across the entire surface of the non-groove forming portion 45, the temperature and pressure of the fixing belt 21 are uniform. Since the paper sheet comes into contact with such a non-groove forming portion 45, heating unevenness of the paper sheet can be suppressed.

Figure 4:
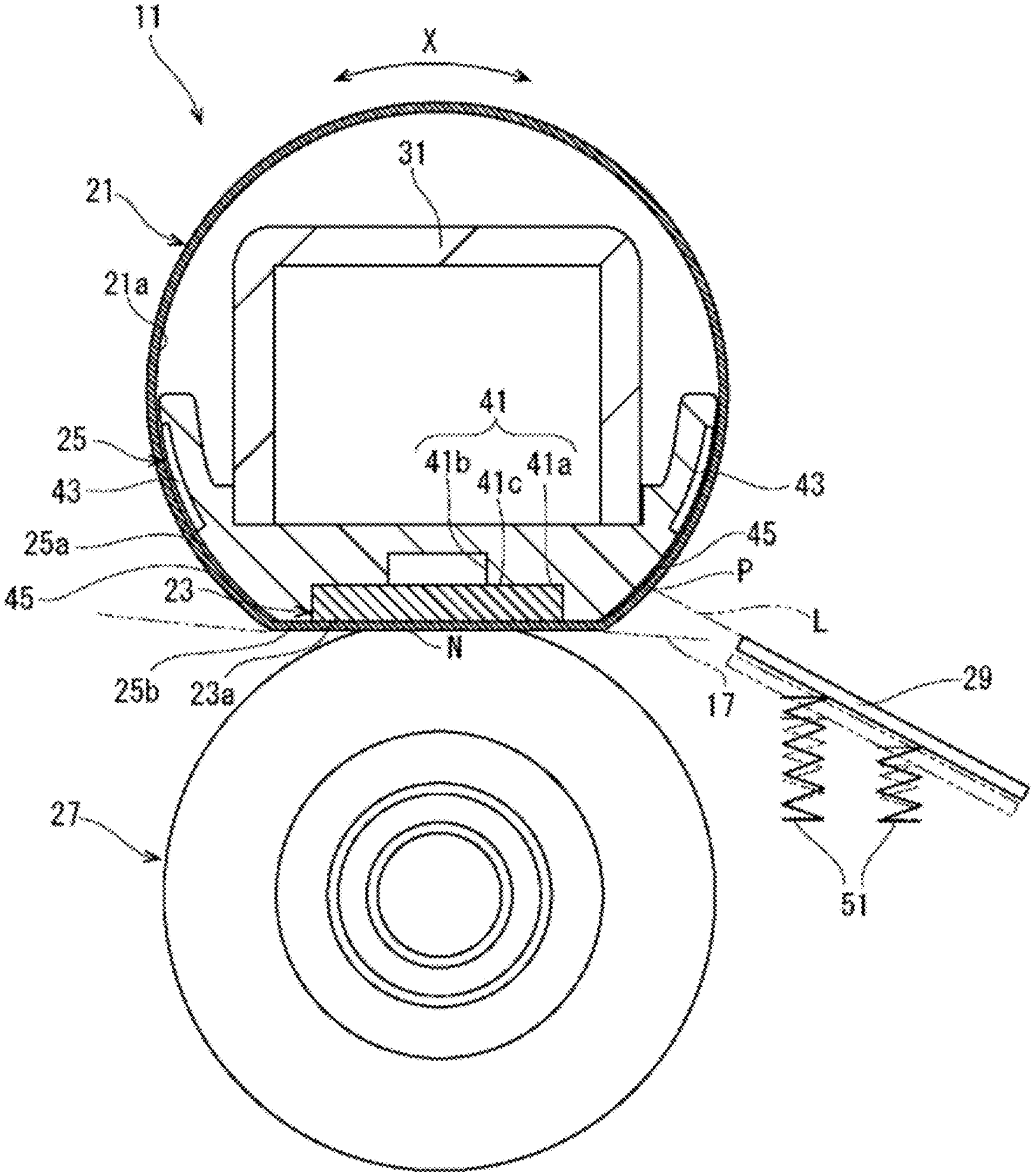
FIG. 4 is a front view showing another example of the fixing device according to the embodiment of the present invention.

Next, the fixing device 11 according to another example of the present invention will be described with reference to FIG. 4. FIG. 4 is a front view showing the fixing device 11.

In this example, the guide 29 is supported while being movable in an up-down direction while maintaining an attitude (a tilted angle) by two coil springs 51. Since there is a gap between the guide 29 and the fixing belt 21, a tip end portion of the paper sheet guided from the guide 29 toward the fixing belt 21 is apt to be bent downwardly in a case where a weight of the paper sheet is light.

As shown in FIG. 2, the intersection point P of the line L extending from the paper sheet guide surface (the upper surface) of the guide 29 and the fixing belt 21 opposes the non-groove forming portion 45 of the retention member 25. Therefore, even when the tip end portion of the paper sheet is bent downwardly, the tip end of the paper sheet can be brought into contact with the fixing belt 21 at a position opposing the non-groove forming portion 45.

However, in a case where the weight of the paper sheet is heavy as in a case of a cardboard or the like, it is difficult for the tip end portion of the paper sheet guided from the guide 29 toward the fixing belt 21 to be bent downwardly. Therefore, when the guide 29 is arranged in correspondence with the light-weight paper sheet, the tip end of the heavy-weight paper sheet may come into contact with the fixing belt 21 at the groove forming portion provided more on the upstream side than the non-groove forming portion 45.

In this regard, by supporting the guide 29 in a state where the guide 29 is movable in the up-down direction, the guide 29 is lowered (see the dash-dot-dot line in FIG. 4) in the case of the heavy-weight paper sheet. Thus, the heavy-weight paper sheet can also be brought into contact with the fixing belt 21 at a position that opposes the non-groove forming portion 45 for sure.

It is noted that when forming the grooves 43 in the retention member 25 as in the present embodiment, the amount of lubricant to be accumulated in the grooves 43 becomes smaller than that of a case of the related art where the grooves 43 are formed to a vicinity of the concave portion 41.

Therefore, the number of grooves 43 may be increased or the depth of the grooves 43 may be increased to thus increase the amount of lubricant that can be accumulated as compared to the related art. Alternatively, a lubricant that is durable even with a small amount may be selected. Moreover, there is no need to form the non-groove forming portion 45 at a position more on the downstream side than the pressure region N.

Furthermore, the descriptions above on the embodiment of the present invention is given on a preferable embodiment of the present invention. Therefore, although various limitations that are technically favorable may be placed, the technical scope of the present invention is not limited to these aspects unless noted otherwise.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A fixing device, comprising:
- an endless rotatable fixing belt;
- a heater which heats the fixing belt;
- a retention member which includes a plurality of grooves for retaining a lubricant and retains the heater such that a surface on a front side comes into contact with an inner circumferential surface of the fixing belt via the lubricant;
- a pressure member which is arranged below the fixing belt and pressed against the heater while the fixing belt is interposed therebetween and forms, with the fixing belt, a pressure region for heating and pressurizing a paper sheet onto which a toner image has been transferred; and
- a guide which guides the paper sheet to the pressure region, wherein
- a portion of the retention member along the inner circumferential surface of the fixing belt includes:
  - a flat portion formed flush with a surface of the heater; and
  - a curved portion formed upstream of the flat portion in a rotation direction of the fixing belt and curved along a circumferential direction of the fixing belt,
- the curved portion includes:
  - a grooved portion in which the plurality of grooves are formed at intervals in a width direction intersecting the circumferential direction; and
  - a non-groove forming portion which is located between the grooved portion and the flat portion and in which no groove is formed, and
- the guide guides the paper sheet to a portion of the fixing belt along the non-groove forming portion.

2. The fixing device according to claim 1, wherein a line extending from a paper sheet guide surface of the guide intersects the portion of the fixing belt along the non-groove forming portion.

3. An image forming apparatus, comprising:

an image forming portion which forms a toner image on a paper sheet; and the fixing device according to claim 1 which fixes the toner image onto the paper sheet.

4. The fixing device according to claim 2, further comprising:

a spring configured to support the guide so as to allow the guide to move in an up-down direction while maintaining a tilted angle of the guide, wherein the guide guides the paper sheet by an upper surface of the guide, and the guide is lowered in accordance with a weight of the paper sheet.

* * * * *